US006287357B1

(12) United States Patent
Lynch et al.

(10) Patent No.: US 6,287,357 B1
(45) Date of Patent: Sep. 11, 2001

(54) SOLID-PHASE PHOSPHORUS BUFFER FOR SUSTAINED, LOW-LEACHING PHOSPHORUS FERTILIZATION OF FIELD-GROWN PLANTS (75) Inventors: Jonathan P. Lynch; Kathleen M. Brown, both of State College; Robert H. Snyder, Howard, all of PA (US)

(73) Assignee: Pennsylvania State University (Penn State), University, PA (US)

( * ) Notice: Subject to any disclaimer, the term of this patent is extended or adjusted under 35 U.S.C. 154(b) by 0 days.

(21) Appl. No.: 09/573,755

(22) Filed: May 18, 2000

Related U.S. Application Data
(60) Provisional application No. 60/135,017, filed on May 20, 1999, and provisional application No. 60/193,103, filed on Mar. 30, 2000.

(51) Int. Cl.[7] .................................................. C05B 7/00
(52) U.S. Cl. ...................... 71/32; 71/33; 71/62; 71/64.11
(58) Field of Search ................... 71/32, 33, 62, 71/64.11

(56) References Cited

U.S. PATENT DOCUMENTS

| 4,407,786 | * | 10/1983 | Drake et al. | 424/14 |
|---|---|---|---|---|
| 5,037,470 | | 8/1991 | Matzen et al. | 71/52 |
| 5,693,119 | | 12/1997 | Lynch et al. | 71/32 |

OTHER PUBLICATIONS

Lynch et al., Crop Sci., vol. 31, pp. 380–387, 1991.*
Coltman, R.R., Gerloff, G.C., and Gabelman, W.H. A Sand Culture System for Stimulating Plant Responses to Phosphorus in Soil. *The Journal of the American Society for Horticultural Science.* 1982. 107(5):938–942. USA.
Brown, K.M., Miller, C.R., Kuhns, L., Beattie, D.J., and Lynch, J.P. Improvement of Rhododendron and Forsythia Growth with Buffered–Phosphorus Fertilizer. *Journal of Environmental Horticulture.* 1999. 17(4):153–157. Horticulture Research Institute. USA.

Borch, K., Brown, K.B., Lynch, J.P. Improving Bedding Plant Quality and Stress Resistance with Low Phosphorus. *Hort Technology.* 1998. 8(4): 575–579. USA.

Lin, Y.P., Holcomb, E.J., Lynch, J.P. Marigold Growth and Phosphorus Leaching in a Soilless Medium Amended with Phosphorus–charged Alumina. *HortScience.* 1996. 31(1):94–98. USA.

Hansen, C.W., Lynch, J.P. Response to Phosphorus Availability during Vegetative and Reproductive Growth of Chrysanthemum: I. Whole–plant Carbon Dioxide Exchange. *Journal of the American Horticulture Society.* 1998. 123(2):215–222. USA.

* cited by examiner

*Primary Examiner*—Chhaya D. Sayala
(74) *Attorney, Agent, or Firm*—Saul Ewing; Janet E. Reed (57) ABSTRACT A method of providing a continuous, buffered, low-leaching phosphorus fertilization of field plants in soil has been developed. The method is broadly applicable to field soils, but is particularly well-suited to soil that has inherently low phosphorus (P) retention ability, including sandy soils, peats, and mucks. The invention describes the use of phosphorus (P) fixed to alumina (Al) as a fertilizer and phosphorus buffer in field soils. The Al—P. when incorporated into soil in a concentration between 0.25 and 20% by weight/volume, will release P from the Al using a dynamic solid phase solution phase exchange equilibrium driven by plant uptake of P, thus providing P for plant growth, while also minimizing P leaching from the soil. The Al—P buffer/fertilizer can be applied and incorporated into field soils prior to planting of crops, grass, or other plants requiring P for growth, or may be incorporated into exposed soil between growing plants to buffer against P leaching and runoff. Importantly, once incorporated into the soil, modified Al can be recharged with P in situ to provide a continuous and persistent P buffer and fertilizer.

35 Claims, 7 Drawing Sheets

| MATERIAL | (mM) | P APPLIED TO ALUMINA (mmoles) | | P ABSORBED BY ALUMINA % OF APPLIED | (µM) | P DESORBED FROM ALUMINA (IN WATER) (mmoles) | % OF ABSORBED | pH OF CHARGED MATERIAL (IN WATER) |
|---|---|---|---|---|---|---|---|---|
| COMPALOX | 20 | 0.50 | 0.46 | 91 | 18.64 | 0.000357 | 0.078 | 7.69 |
| COMPALOX | 100 | 2.50 | 2.40 | 96 | 116.41 | 0.002270 | 0.095 | 7.17 |
| DD-2 | 20 | 0.50 | 0.49 | 99 | 3.60 | 0.000065 | 0.013 | 6.82 |
| DD-2 | 100 | 2.50 | 2.45 | 98 | 69.25 | 0.001247 | 0.051 | 6.67 |

SOLID-PHASE PHOSPHORUS BUFFER FOR SUSTAINED, LOW-LEACHING PHOSPHORUS FERTILIZATION OF FIELD-GROWN PLANTS

This application claims priority to U.S. Provisional Application 60/135,017, filed May 20, 1999 and to U.S. Provisional Application 60/193,103, filed Mar. 30, 2000. All of these applications are incorporated in their entirety herein by this reference.

FIELD OF THE INVENTION

The present invention relates to the field of agriculture fertilizer and soil maintenance. In particular, the invention relates to the continuous phosphorus fertilization of plants growing in soil, particularly soil that has inherently low phosphorus (P) retention ability. including sandy soils, peats, mucks, and other organic soils. The invention describes the use of a solid-phase phosphorus buffer for sustained, low-leaching P fertilization of field-grown plants.

BACKGROUND OF THE INVENTION

P is one of the essential mineral nutrients that is directly involved in plant metabolism and cannot be replaced by other elements. In the absence of P, a plant will not be able to complete its life cycle. P is one of the macro nutrients which is required in higher amounts for optimal plant growth.

The main driving force for P in moving to the root surface is by diffusion. Diffusion occurs when ions move from a region of higher concentration to lower concentration. Diffusion through a short distance is much faster than through a long distance because the time required for a substance to diffuse a given distance is determined by the square of the distance. This suggests that the uptake of a certain nutrient by diffusion is strongly related to available ions close to the root surface. P is usually stabilized in soils and tends to be less mobile as compared to other nutrients.

Aluminum (Al) is not an essential element for plant growth. Most plants are sensitive to high Al concentrations. Al interferes with the uptake of P directly through the precipitation of aluminum phosphate. Since Al is immobile in plant tissue, it is seldom transported to shoots and the accumulation is mostly confined to the roots.

A solid-phase fertilizer/buffer made from aluminum oxide pellets (alumina, $Al_2O_3$) and P (collectively, Al—P) was originally developed for a P nutrition study in a container system using sand as the growing medium. The purpose of using Al—P was to simulate a realistic supply in the controlled environment. Coltman, R. R., Gerloff, G. C., and Gabelman, W. H. (A Sand Culture System for Stimulating Plant Responses to Phosphorus in Soil. *The Journal of the American Society for Horticultural Science*. 1982. 107(5):938–942) first developed the sand-alumina culture system with P supplied from the P-adsorbed alumina, which was obtained from the activated alumina loaded with phosphate ($KH_2PO_4$). This sand-alumina culture technique not only showed promise for simulating plant responses to P concentrations under conditions comparable to those found in soils, but also provided a range of stable and reproducible P concentrations for a more ideal experimental medium. The P concentration desorbed from sand-alumina were dependent on the P concentration loaded on the Al, and after the stability of solution P concentration in the culture had been reached, increasing the density of P loaded Al in sand had no effect on the average culture P concentration. Thus, diffusion, the rate-limiting step in absorption of P from soil, appeared to be rate-limiting in sand-Al system as well. Additionally, the extent of the diffusion-limitation could be manipulated by changing Al density (Coltman et al., 1982).

U.S. Pat. No. 5,693,119 to Lynch, et al. also discloses the use of Al—P in soilless growing media for container plants, such as peat, vermiculite, perlite, and mixtures thereof. Lynch. et al. patent disclosed that the soilless container system with Al—P displayed greatly reduced P leaching from the container and plants displayed growth that was equivalent or superior to that of plants grown with conventional fertilizers. However, the Lynch, et al. patent does not exemplify application of an Al—P system to anything other than a low-soil or soilless container system.

The conditions in sand culture, soilless, and low-soil container systems differ from the soil-based growing medium of field grown plants, where the plants are in an environment with a rate-limiting supply of P. This is mainly due to the limited P source in soils. due to sites on soil particles (including naturally-occurring Al, Fe, and other elements) which adsorb P and which at a later time may release P back to the soil solution.

Natural soil is subject to considerable complexity in nutrient transformations by biological and chemical processes, and many natural soils have some degree of buffering already. The utility of alumina as a phosphorus buffer in soil raises different technological issues. such as recharging, depth of incorporation, desorption rate, physical persistence saturation thresholds, and other aspects of its performance in soil that differ from phosphorus buffering in soilless media.

In addition, two specific problems are associated with traditional sustained and/or intensive phosphorus fertilization of field soils. The first is that the phosphorus through leaching or runoff may find its way to rivers, streams, estuaries, and other bodies of water. Since biological activity in many aquatic systems is limited by low phosphorus availability, this influx of phosphorus creates algal blooms and other biological responses that are generally detrimental. A number of solutions have been applied to this problem, such as reduction of fertilizer application, reduction of erosion and runoff from agricultural lands through contour terracing, riparian green strips, retention ponds, and technologies such as coated fertilizers which may release phosphorus more slowly into the soil. These methods require greater expense, as well as expertise or sophistication in monitoring the phosphorus content of the soil and the leachate.

A second problem associated with current phosphorus fertilization methods in agriculture is that the resulting periodic high soil phosphorus availability may have detrimental effects on crop growth, by reducing root growth, and by creating nutritional imbalances with other essential nutrients such as Ca, Zn, and Fe. Currently available phosphorus fertilizers and methods for fertilizing field soils do not adequately synchronize the phosphorus supplying capacity of the soil with the phosphorus demand of growing plants. Many technologies have been employed to address this problem, and some are effective to a limited extent. However, such approaches may require greater expense by the grower, greater expertise or sophistication in monitoring the nutritional requirements of a growing crop to avoid deficits, or they not be well suited to soils of inherently low phosphorus retention capacity, such as sandy soils. organic soils, and soils that are already saturated with phosphorus from previous phosphorus applications. For example, the use of "slow release" phosphorus fertilizers, such as Osmocote, or to use a generic former, resin-coated fertilizer, is not always optimal since these products release phosphorus as a function of water content of the soil, temperature of the soil, and time, which may not be directly associated with the timing of the nutritional requirements of the crop.

From the foregoing discussion, it can be seen that a need exists to provide field crops and plants with a suitable level of P while minimizing P leaching from the soil field and minimizing contamination of the surface runoff with P. There is a need for release of the P over an extended period of time and in lower levels in the soil solution to encourage better field plant growth than current technologies. There is a further need for recharging of P fertilizer in place (in situ).

SUMMARY OF THE INVENTION

This invention addresses the aforementioned problems by creating a phosphorus buffering system in soil, by which phosphorus concentrations in the soil solution are held at a steady level by chemical equilibrium between solid phase and solution phase phosphorus. Other features and advantages of the present invention will be appreciated by reference to the drawings, detailed description and examples that follow.

The term "soil" is to be broadly construed, and it is understood that the term includes, but is not limited to, naturally occurring earthen soils, as well as earthen soils containing additives, and all combinations or mixtures thereof. "Soil" is not meant to exclude earthen growing media with minor amounts of non-soil elements.

A solid-phase phosphorus buffer fertilizer technology that provides continuous levels of P to field plant roots while minimizing leaching of P from the soil has been developed. The technology maintains or improves field plant performance while minimizing P leaching and the need for repeated application of P fertilizers. By holding the solution-phase phosphorus at a low level, phosphorus leaching through the soil is greatly reduced, and a steady supply of phosphorus to plant roots is assured, regardless of plant growth rate. Addition of this phosphorus technology to soil will bestow upon the soil the ability to retain and release phosphorus in a manner which reduces undesirable phosphorus leaching from the soil while improving the nutrition of the plant, in a manner which is very easy for growers to implement.

The invention is based on reversible binding of P to solid Al in such a manner that P will be bound to the solid Al, which is amended to field soils. The Al may be supplied in various forms, including but not limited to commercially available alumina ($Al_2O_3$) pellets. Alternative starting materials for production of the buffer include, but are not limited to aluminum hydroxide, clays, and oxide rich soils. A preferred method for making the modified alumina for use as a controlled release phosphorus fertilizer/buffer comprises contacting alumina with a solution containing phosphoric acid for a time sufficient to bind the desired amount of phosphorus onto the alumina. In a preferred embodiment, the alumina may be wetted before contacting the alumina with the phosphoric acid solution. In another preferred embodiment, the solution contains 15–500 mM phosphoric acid and a final pH of 6.0–7.5. Another preferred embodiment further comprises drying the modified alumina. Another embodiment comprises combining the modified alumina with one or more other plant nutrients.

One composition of the present invention comprises more than 50% by weight/volume of soil, and 0.25–20% by weight/volume of the modified alumina, wherein the alumina comprises 0.1–150,000 ppm phosphorus bound to the alumina by a process comprising contacting acid-activated alumina with a phosphate. A preferred version of the composition comprises 0.5–16% of modified alumina by weight volume and 1–1000 ppm phosphorus, and the most preferred embodiment comprises 1–2% of modified alumina by weight/volume and 0.3–6.2 ppm phosphorus.

Methods of fertilizing and buffering field soils has also been developed which comprises application of the modified alumina to field soils to yield a field version of the composition immediately heretofore described, wherein the phosphorus bound to the alumina is desorbed and released into the soil in a sustained fashion thereby supplying a consistent supply of phosphorus to the plants. In a preferred embodiment the phosphorus is desorbed at a rate of 0.2–500 micromolar, and in the more preferred embodiment, the desorption rate is 1–250 micromolar. and in the most preferred embodiment the rate is 50–200 micromolar. At the time of application of the modified alumina, the field soils may be planted or unplanted.

Following application of the Al—P fertilizer/buffer to soil, P concentration in the soil is held at a steady level by chemical equilibrium between solid-phase and solution phase P. The field plants will take up the P that is available so that additional P will be released. It should be noted that the driving force for the release of P from the Al is P uptake by the plant. This mechanism will permit normal plant growth with low levels of P in the soil solution. Since there are low levels of P in soil solution there will be much less leaching of P than there would if P was added at each irrigation. This invention is different from existing slow release fertilizers in the mode by which the P is released. For example, resin-coated fertilizers release P as a function of water content of the soil, temperature of the soil, and time, rather than the dynamic solid phase/solution phase P exchange equilibrium of Al—P which is driven by P uptake by the plant.

Once activated alumina is incorporated into field soil, the material can be recharged through subsequent fertilizer application; therefore, it not only acts as a phosphorus source in the initial period of application, but also will thereafter act as a buffering agent for subsequent phosphorus fertilizer applications. Similarly, activated alumina can be used to reduce phosphorus availability and leaching from soils which are already saturated with phosphorus through previous heavy applications of phosphorus fertilizers and animal manures. An example of a region with such soil is Southeastern Pennsylvania.

The invention further comprises a method to recharge depleted Al—P in situ to restore the desired phosphorus concentration to the modified alumina. Depleted Al—P in soil can be recharged in situ by any one of several processes. A preferred embodiment uses a phosphorus containing liquid for recharging, a more preferred embodiment uses a liquid containing phosphoric acid, and in the most preferred embodiment the phosphoric acid concentration range is compatible with a standard agricultural fertigation system. The phosphorus containing liquid must remain in contact with the depleted Al—P soil composition for a time sufficient to restore the desired phosphorus concentration to the modified alumina, and in a preferred embodiment the liquid remains in contact with the soil for at least 48 hours.

Another possible use of acid-activated alumina or desorbed Al—P is as a phosphorus filter for effluent from greenhouses and other point sources of phosphorus runoff, once charged with phosphorus through use as a filter, the filter material can then be used as a fertilizer and fertility amendment, as described above.

DETAILED DESCRIPTION OF THE INVENTION

The Al—P can be made by any one of several processes, and examples of several preferred embodiments are found in the Examples section. Other examples can be found in U.S. Pat. No. 5,693,119 to Lynch, et al., the entirety of which is incorporated by reference herein. The method for making Al—P generally comprises:

1) wetting of solid-phase alumina;
2) activating the wetted alumina by acidification;
3) rinsing the activated alumina;
4) contacting the rinsed, activated alumina with a phosphate; and, optionally,
5) drying. In the most preferred embodiment, acidification (step 2) is performed using phosphoric acid, effectively eliminating the need for an intermediate rinse (step 3) and a separate phosphate contact step (step 4).

Wetting is generally accomplished by placing the alumina in a container of suitable size, and contacting the alumina with a wetting solution for a time sufficient to ensure contact and saturation with all surfaces of the alumina. Preferably, the wetting solution is water; more preferably, the wetting solution is distilled water. Preferably, the alumina may be mechanically agitated during wetting; more preferably, the container may be rotated, tumbled, or shaken. The wetting agent must be in contact with the alumina for a time sufficient to ensure wetting. Preferably, the wetting agent is in contact with the alumina for at least 30 minutes. Preferably, after vetting, a portion of the wetting solution is drained off; more preferably, at least 10% of the as wetting solution is drained off.

Acidification is generally accomplished by contacting the wetted alumina with an acid of appropriate concentration for a time sufficient to activate the surface of the alumina. Preferably, the acid is either hydrochloric acid (HCI) or phosphoric acid ($H_3PO_4$); more preferably, the acid is [0.275N] hydrochloric acid; most preferably. the acid is 15–500 mM phosphoric acid in water. The acid should be uniformly distributed throughout the alumina. Preferably, uniform distribution of the acid is ensured by mechanical agitation; more preferably, the container may be rotated, tumbled or shaken. The acid must remain in contact with the alumina for a period of time sufficient to ensure activation. When hydrochloric acid or another non-phosphorus acid is used, the preferred contact time is at least 30 minutes, and the resulting pH should be in the range of 3 to 7. When phosphoric acid is used, the contact time is preferably from 1–5 hours, and the resulting pH is preferably between 6.0–7.5, and make preferably between 6.3–7.4. Following acidification, the acid solution is drained off.

Rinsing is generally accomplished contacting the alumina with water for a time sufficient to ensure contact and saturation with all surfaces of the alumina. Preferably, distilled water is used. Preferably, the alumina may be mechanically agitated during rinsing; more preferably, a stirring mechanism may be used to agitate the alumina; most preferably, the container may be rotated, tumbled, or shaken. The rinse agent should remain in contact with the activated alumina for a period sufficient to rinse any excess salts from the alumina surface and surrounding solution; preferably for at least 30 minutes. After rinsing, rinse solution is drained off. When hydrochloric acid or another acid is used, a second rinse using distilled water is preferred to yield a rinse solution with pH preferably between 3.8 and 4.0, and a portion of the second rinse is retained for the next step, contacting the activated alumina with a phosphate. In the most preferred embodiment, phosphoric acid is used in acidification (step 2), eliminating the need for this rinse step (step 3).

Contacting the activated alumina with a phosphate is generally accomplished by adding a phosphate salt to the solution resulting from the second rinse. Preferably, the phosphate salt is in solution; more preferably, the phosphate salt is provided as $KH_2PO_4$; most preferably, the phosphate salt is provided as 1M $KH_2PO_4$. Preferably, uniform distribution of the phosphate salt acid is ensured by application of the phosphate salt solution using a drenching method; more preferably, the activated alumina mixture is mechanically agitated; most preferably, the container may be rotated, tumbled or shaken. The acid must remain in contact with the alumina for a period of time sufficient to ensure activation; preferably for a period of at least two hours. Following the contact period, the pH of the alumina-phosphate solution should be only slightly acidic; more preferably, pH is less than 7; most preferably, the pH is 6.5. Following phosphate charging, the loading solution is drained off, and the phosphate-charged alumina is rinsed with distilled water using the rinse procedure previously described. Following rinse, the rinse solution is drained off. In the most preferred embodiment, phosphoric acid is used in acidification (step 2), eliminating the need for a separate phosphate contact step and subsequent rinsing.

Drying is optional, and is generally accomplished by placing the P charged alumina in a drying oven. Preferably, the Al—P is placed on drying trays and exposed to a drying temperature of 40–60° C. until dry. Usually, a sufficient drying time under these conditions is 24–48 hours. Alternatively, the Al—P may be air dried.

Following dring, the resulting amount of P bound to the alumina is generally between 0.10–150,000 ppm. Preferably, the amount is between 0.10–1000 ppm, and most preferably between 0.34–6.15 ppm. The resulting phosphorus desorption rate (or buffering rate) of Al—P is preferably about 0.2–500 μM; more preferably between 1–250 μM; and most preferably 50–200 μM. The desorption rate can be determined by persons skilled in the art using methods well known in the art. A preferred embodiment of testing the desorption rate in water is set forth in the Examples. Phosphorus desorption rate determination testing generally comprises placing a known quantity of Al—P in a known volume of distilled water, agitating the solution, letting the solution stand for a known period of time, filtering the supernatant, and analyzing the supernatant for phosphorus using methods well-known to those skilled in the art.

The Al—P can be applied to soil by any one of several processes, and examples of several preferred embodiments are found in the Examples section. The method for applying Al—P to soils generally comprises distributing a known quantity of Al—P on the soil surface, followed by incorporation or mixing of the Al—P into the soil.

Distributing Al—P on the soil surface generally comprises calculation of the volume of soil to be treated using methods known by persons skilled in the art, measuring the volume of Al—P into an agricultural apparatus for distributing dry fertilizers (such as a broadcast spreader), and delivering the Al—P at a calculated rate onto the soil surface. The amount of Al—P required can be calculated by persons skilled in the art, and will vary depending upon the characteristics of the soil, the needs of the species of plants, and the charge of the Al—P.

With respect to buffering against phosphorus leaching, sandy soils and other soils with low phosphorus retention characteristics generally require more Al—P, while clay soils and other soils with higher phosphorus retention characteristics generally require less Al—P. The preferred amount of Al—P as a percentage of soil by volume/weight ranges from 0.25% to 20%; more preferably, the range is 0.5% to 16%; and most preferably, the range is 1–2%. The required phosphorus desorption concentration will also vary depending upon the composition of the soil and the plant requirements, but is preferably between 0.2 and 500 $\mu$M; more preferably, the rate range is 1–250 $\mu$M; and, most preferably, the rate is 50–200 $\mu$M.

Incorporation of Al—P into the soil generally consists of plowing or tilling the soil to the desired depth using methods known to those skilled in the art. Preferably, the incorporation method will evenly distribute the Al—P throughout the volume of soil; most preferably, the Al—P will be most prevalent at the root depth of the seeds or plants. Although it is preferred to incorporate Al—P into bare soil, incorporation of Al—P can be performed in planted crop fields using the same methods described herein for unplanted soil. The method is modified to incorporate the Al—P into exposed soil between growing plants, taking care not to damage the root structure of the plants. Application to exposed soil between growing plants would further serve to buffer against P leaching and runoff from exposed soils.

In field use, it would be desirable to recharge depleted Al—P in situ. The Al—P in soil can be recharged in situ by any one of several processes, and examples of several preferred embodiments are found in the Examples section. The preferred method for recharging Al—P in situ generally comprises: 1) wetting the soil; and, 2) applying a phosphorus containing liquid and allowing the phosphorus containing liquid to remain in contact with the soil for a sufficient time to recharge the Al—P.

Wetting the soil is generally accomplished by application of water to the field soil to soil capacity by methods well known to persons skilled in the art. Preferably, the water is applied through agricultural irrigation methods or natural heavy rainfall; more preferably, water is applied using agricultural sprinkler irrigation methods; most preferably, water is applied using an agricultural overhead spray system.

Application of a phosphorus-containing liquid is generally accomplished by methods well known to persons skilled in the art. Preferably, the phosphorus-containing liquid is applied through a liquid fertigation (fertilization/irrigation) system; more preferably, the phosphorus-containing liquid is applied using an overhead agricultural fertigation system. Preferably, the phosphorus-containing liquid is a liquid fertilizer; more preferably, the liquid contains phosphoric acid; most preferably, the liquid contains a phosphoric acid concentration between 5–100 mM. The amount of phosphorus-containing liquid to be applied, and the soil contact time required for recharging can be determined by methods known to persons skilled in the art. In the preferred embodiment for recharging 2% Al—P incorporated into sandy soil, [20 mM] phosphoric acid was applied at the rate of 100 gallon per 1000 square feet of soil, and allowed to remain in contact with the soil for 48 hours prior to planting. The results shown in FIG. 5 demonstrate that soil containing Al—P and used for crop production for 2 years can be successfully recharged. Since Al—P is not highly migratory due to its low solubility, it is anticipated that Al—P incorporated into field soil will remain in place., and can be successfully recharged in situ for many years. The same phosphorus recharging method can be applied to Al in situ which has not been previously loaded with P.

Recharging of Al—P can be performed in planted fields or on unplanted soil using the same methods described herein, and using the same phosphorus-containing liquids. Experimental results show that soil containing Al—P and used for plant production for 2 years can be successfully recharged with P by treatment with $H_3PO_4$ in the range of concentrations that can be applied through agricultural fertigation systems. The following examples are representative of Applicant's invention and not meant to unduly limit the scope of the invention. The examples are drawn to specific methods of charging the Al with P, use of the charged fertilizer for growing plants in soil and for buffering, where P runoff is of particular concern, and recharging of the Al—P in situ.

EXAMPLE 1

Method For Charging Phosphorus onto Alumina— 20 kg method

This procedure applies to a 20 kg mass of Compalox (AN/V-801) in a charging solution volume of 70 L accomplished in a 55 gallon (208 L) stainless steel drum.

Step 2: Wetting Alumina:
 a) Place 20 Kg of raw Compalox alumina in the drum.
 b) Add 70 L of distilled water and stir well for 30 seconds with a paddle.
 c) Mix by rotating the drum for 30 minutes to thoroughly wet the alumina.

Step 2: Acidification
 a) Remove 7 L of wetting rinse and discard.
 b) Add 7 L of 2.75 N HCl and stir well with paddle.
 c) Mix by rotation for 1 hour (pH after acidification should be between 3.0 to 3.5).
 d) Discard the used acid solution.

Step 3: Acid Removal Rinse 1
 a) Add 70 liters of distilled water to the acidified alumina and stir with a paddle to mix.
 b) Rotate drum for 30 minutes. After 30 minutes, the pH should be between 3.5 to 3.7.
 c) Discard the rinse.

Step 4: Acid Removal Rinse 2
 a) Add 70 liters of distilled water and mix with a paddle for 1 minute.
 b) Rotate for 30 minutes. After 30 minutes the pH should be between 3.8.4.0
 c) Retain the rinse.

Step 5: Charging the Phosphorus (for 148 mM $KH_2PO_4$)
 a) Remove and discard 10.36 L of the last rinse.

b) Add 10.36 L of 1 M $KH_2PO_4$ and stir with a paddle for 1 minute to mix.

c) Rotate the drum for 2 hours to load the $KH_2PO_4$ onto the alumina matrix. Stop drum rotation and stir the alumina with a paddle for one half minute at 45 and 90 and 120 minutes.

d) After the charging cycle is complete, determine pH of the supernatant, and remove 2–40 ml samples of solution for P analysis (pH should be 6.5).

e) Discard the spent loading solution.

Step 6: Final Rinse for Removal of Excess Salt a) Add 70 L of distilled water to the P-loaded alumina and stir with a paddle.

b) Rotate the drum for 30 minutes.

c) Retain 2–40 ml samples of the rinse solution for P-analysis. Read the pH of the rinse water (pH should be about the same as in step 4).

d) Discard the rinse.

Step 7: Drying a) Place the charged alumina on trays. and dry in a 40–60° C. oven.

Step 8: Phosphorus Desorption Test a) To check the phosphorus desorption (uM P), place 2 g of the dried material in 20 ml of distilled water, shake 4–5 times by hand, and allow to stand on the lab bench overnight. (It is recommended to take from 10 to 20 subsamples to check consistency of desorption throughout the entire batch.)

b) Filter the supernatant through a 0.45 $\mu$m nylon membrane and analyze for phosphorus.

EXAMPLE 2

Method For Charging Phosphorus onto Alumina— Modified to Permit Scaling Up For Industrial Bulkloading of 1 Metric Ton Amounts of Alumina.

Step 1: Wetting Alumina:

a) Place 1,016 Kg of raw Compalox in a reactor vat.

b) Add 3,556 L of,water.

c) Mix for 30 minutes with an industrial mixing screw to thoroughly wet the alumina.

d) Discard water after wetting.

Step 2: Acidification:

a) Add 3,556 L of 0.275 N hydrochloric acid (HCl).

b) Mix for 1 hour (pH after acidification should be between 3.0 to 3.5).

c) Discard the used acid solution.

Step 3: Acid Removal Rinse 1:

a) Add 3,556 L of water to the acidified alumina, and mix for 30 minutes.

b) After 30 minutes., the pH should be between 3.5 to 3.7.

c) Discard the rinse.

Step 4: Acid Removal Rinse 2:

a) Add 3,556 L of water and mix for 30 minutes. After 30 minutes, the pH should be between 3.8–4.0.

b) Discard rinse.

Step 5: Loading the Phosphorus:

a) Add 3,556 liters of 148 mM $KH_2PO_4$ solution to the acidified/rinsed alumina, and mix for 2 hours.

b) After loading (pH should be 6.5).

c) Discard the spent loading solution.

Step 6: Final Rinse for Removal of Excess Salt a) Add 3,556 L of distilled water to the P-loaded alumina and mix for 30 minutes.

b) Discard the rinse.

Step 7: Drying a) Place charged product onto a filter belt to remove excess water.

b) Dry between 40–60° C.

Step 8: Phosphorus Desorption Test a) To check the phosphorus desorption (uM P), place 2 g of the dried material in 20 ml of distilled water, shake 4–5 times by hand, and allow to stand on the lab bench overnight. (It is recommended to take from 6 to 10 subsamples to check consistency of desorption throughout the entire batch.)

b) Filter the supernatant through a 0.45 $\mu$m nylon membrane and analyze for phosphorus.

EXAMPLE 3

Laboratory Method for Charging of Phosphorus onto Alumina Using Phosphoric Acid

1) Pre-wet alumina (100 g) with distilled water (70 ml).

2) Acidify and charge the alumina with phosphoric acid ($H_3PO_4$) [20–100 mM] solution in water.

3) Allow phosphoric acid to remain in contact with the alumina for 1–2 hours.

4) Discard the spent phosphoric acid solution.

5) Rinse the charged alumina with 70 ml of distilled water.

6) Discard the rinse water.

7) Dry the alumina in a 40–60° C. drying oven prior to testing and use.

EXAMPLE 4

Scaleable Laboratory Method for Charging of Phosphoric Acid onto Alumina Using Phosphoric Acid Step 1: Wetting the Alumina a) Place 8 g of alumina in a 40 ml snap cap tube b) Add 25 ml of distilled water c) Wet alumina on a shaker at 200 rpm for 15 minutes d) Discard the wetting solution Step 2: Charging the Alumina a) Add 30 ml of phosphoric acid ($H_3PO_4$) [20–100 mM] solution in water to the wetted alumina.

b) Mix charging solution and alumina at 200 rpm on a shaker for 1 hour.

c) Retain an aliquot of charging solution for analysis.

d) Discard charging solution.

Step 3: Rinsin, the Alumina a) Remove excess phosphorus by rinsing with 25 ml distilled water on the shaker at 200 rpm for 15 minutes.

b) Retain an aliquot of the rinse for analysis c) Discard rinse

Step 4: Drying Charged alumina a) Dry the charged material in a 40–60° C. drying oven for 24–48 hours.

Example 5

Scaleable Experimental Laboratory/Bulk Method for Charging Raw Alumina with Phosphoric Acid (no pre-wetting, no rinsing after loading)

Step 1: Charging the Alumina (use 1 part alumina: 1 part phosphoric acid solution)

a) Place 10 g of alumina in a 40 ml snap cap tube b) Add 10 ml of phosphoric acid solution (in water: presently using 20 or 100 mM $H_3PO_4$) to the alumina.

c) Allow charging solution to remain in contact with alumina for 1 hour

Step 2: Drying Charged alumina a) Dry the charged Al—P in a 40–60° C. drying oven for 24–48 hours.

The following results were obtained using this method:

| Alumina | H3PO4 mM | mmoles P in loading solution | mMP in solution after loading | mmoles P in solution after loading | mMP in solution after rinsing | mmoles P in solution after rinsing |
|---|---|---|---|---|---|---|
| DD-2 | 20 | 0.500 | No loading solution remaining | | No rinse was done | |
| DD-2 | 20 | 0.500 | | | | |
| DD-2 | 20 | 0.500 | | | | |
| DD-2 | 100 | 2.500 | | | | |
| DD-2 | 100 | 2.500 | | | | |
| DD-2 | 100 | 2.500 | | | | |

| Alumina | P applied as H3PO4 (mM) | P adsorbed by alumina (mmoles) | % of applied P adsorbed by alumina | P desorbed (in water) (uM) | P desorbed (in water) (mmoles) | % of adsorbed P desorbing from alumina |
|---|---|---|---|---|---|---|
| DD-2 | 20 | 0.500 | 100.0 | 4.22 | 0.000064 | 0.013 |
| DD-2 | 20 | 0.500 | 100.0 | 3.80 | 0.000070 | 0.014 |
| DD-2 | 20 | 0.500 | 100.0 | 3.88 | 0.000060 | 0.012 |
| DD-2 | 100 | 2.500 | 100.0 | 56.10 | 0.001121 | 0.045 |
| DD-2 | 100 | 2.500 | 100.0 | 52.70 | 0.001109 | 0.044 |
| DD-2 | 100 | 2.500 | 100.0 | 50.84 | 0.001510 | 0.060 |

The following table shows P desorption results from a series of 20 ml rinses with distilled water of P made using the above method:

| P applied as H3PO4 (mM) | P adsorbed by alumina (mmoles) | Rinse # | P desorbed (in water) (uM) | P desorbed (in water) (mmoles) | % of adsorbed P desorbing from alumina | % of applied P |
|---|---|---|---|---|---|---|
| 20 | 0.500 | 1 | 4.22 | 0.000064 | 0.013 | 0.013 |
| 20 | 0.500 | 1 | 3.80 | 0.000070 | 0.014 | 0.014 |
| 20 | 0.500 | 1 | 3.88 | 0.000060 | 0.012 | 0.012 |
| 100 | 2.500 | 1 | 56.10 | 0.001121 | 0.045 | 0.045 |
| 100 | 2.500 | 1 | 52.70 | 0.001109 | 0.044 | 0.044 |
| 100 | 2.500 | 1 | 50.84 | 0.001510 | 0.060 | 0.060 |
| 20 | 0.500 | 2 | 2.6444 | 0.00005 | 0.011 | 0.0106 |
| 20 | 0.500 | 2 | 4.987 | 0.00010 | 0.020 | 0.0199 |
| 20 | 0.500 | 2 | 4.1671 | 0.00008 | 0.017 | 0.0167 |
| 100 | 2.500 | 2 | 64.84 | 0.00130 | 0.052 | 0.0519 |
| 100 | 2.500 | 2 | 59.82 | 0.00120 | 0.048 | 0.0479 |
| 100 | 2.500 | 2 | 61.65 | 0.00123 | 0.049 | 0.0493 |
| 20 | 0.500 | 3 | 2.0898 | 0.00004 | 0.008 | 0.0084 |
| 20 | 0.500 | 3 | 1.9311 | 0.00004 | 0.008 | 0.0077 |
| 20 | 0.500 | 3 | 1.666 | 0.00003 | 0.007 | 0.0067 |
| 100 | 2.500 | 3 | 30.63 | 0.00061 | 0.025 | 0.0245 |
| 100 | 2.500 | 3 | 28.04 | 0.00056 | 0.022 | 0.0224 |
| 100 | 2.500 | 3 | 34.12 | 0.00068 | 0.027 | 0.0273 |
| 20 | 0.500 | 4 | 1.2169 | 0.00002 | 0.005 | 0.0049 |
| 20 | 0.500 | 4 | 0.7407 | 0.00001 | 0.003 | 0.0030 |
| 20 | 0.500 | 4 | 0.8465 | 0.00002 | 0.003 | 0.0034 |
| 100 | 2.500 | 4 | | 0.00000 | 0.000 | 0.0000 |
| 100 | 2.500 | 4 | 33.12 | 0.00066 | 0.026 | 0.0265 |
| 100 | 2.500 | 4 | 30.63 | 0.00061 | 0.025 | 0.0245 |
| 20 | 0.500 | 5 | 0.4894 | 0.00001 | 0.002 | 0.0020 |
| 20 | 0.500 | 5 | 0.9259 | 0.00002 | 0.004 | 0.0037 |
| 20 | 0.500 | 5 | 1.0052 | 0.00002 | 0.004 | 0.0040 |
| 100 | 2.500 | 5 | 31.69 | 0.00063 | 0.025 | 0.0254 |
| 100 | 2.500 | 5 | 30.47 | 0.00061 | 0.024 | 0.0244 |
| 100 | 2.500 | 5 | 28.36 | 0.00057 | 0.023 | 0.0227 |

EXAMPLE 6

Laboratory Method/Test for Recharging Al—P in situ

Step 1: Wetting the soil:

a) Line the bottom of a several 4" round plastic pot with a circle of miracloth to prevent loss of the sandy soil via the drain holes.

b) Fill each pot with 300 ml of soil containing deleted Al—P (containing either 1% or 2% Al—P).

c) Place each pot of soil over a 1 quart, wide-mouth glass canning jar; to collect leachate.

d) Wet the soil in each pot to saturation with 4–50 ml applications of distilled water.

e) Collect and measure the volume of leachate from each pot.

f) Retain a 10 ml aliquot of the leachate and filter through a 0.45 μm nylon membrane prior to P-analysis.

Step 2: Charging the Al—P in situ:

a) Charge the Al—P in situ by percolating a single 35 ml volume of phosphoric acid through the soil. Rates of phosphoric acid used: a) for 1% soils: 5 and 10 mM phosphoric acid; b) for 2% soils: 10 and 20 mM phosphoric acid. NOTE: The 35 ml volume of phosphoric acid solution was equivalent to a single 100 gal/1000 ft 2 drench application of fertilizer by tractor at Yoder Bros.

b) Repeat step 1, e–f c) After recharging, the pots are allowed to sit on the bench overnight (approximately 18 hours). This will permit maximum adsorption of the phosphorus onto the alumina.

Step 3: Check of buffering capacity:

a) To test the buffering capacity of the soils, 6 successive rinses of 35 ml distilled water were passed through each pot.

b) The leachate from each pass was collected, measured for volume and a 10 ml aliquot was retained P-analysis.

EXAMPLE 7

1998–1999 Chrysanthemum Trials

Trial #1 occurred between Oct. 30, 1998 to May 3, 1999. A raised bed (Florida sandy soil) 144' long by 42' wide was created, and was fitted with drainage tiles and pipe to collect leachate. Each block or replicate was 36' long. The three phosphorus treatments were conventional fertilizer control, 1% and 2% Al—P fertilizer (wt/vol). The alumina used for the trial was Compalox (supplied by Martenswerk, Germany, subsidiary of Alusuisse). The Al—P was prepared with a buffering capacity of 275 $\mu$M P. Trial #2 occurred between Jun. 30, 1999 and Nov. 5, 1999. The same raised bed plot was used, in order to evaluate the use of the Al—P fertilizer for a second season of cutting production. Three harvests of cuttings (15 cuttings/treatment) from 7 varieties of mum were evaluated. Parameters measured included leaf area (2nd and 3rd harvests only), dry weight, tissue-P. Leachate water was also collected weekly and analyzed for phosphorus.

Figure 1:
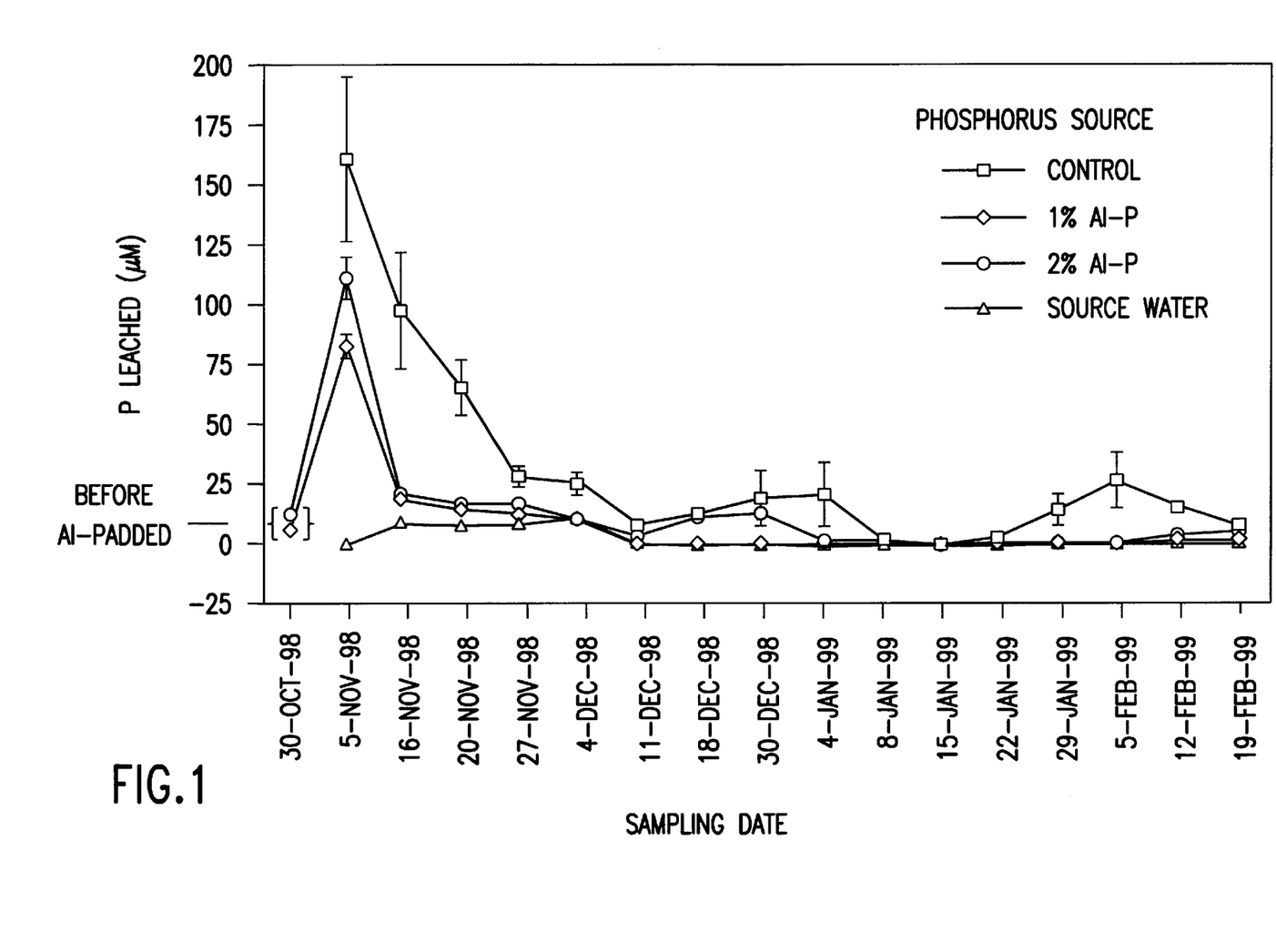
FIG. 1 is a graph showing phosphorus in leachate from beds of Florida field soil, with the x-axis showing leachate sampling dates, and the y-axis showing phosphorus leached ($\mu$M) from field soil during Chrysanthemum Trial 1 (1998) comparing conventional fertilizer versus soil amended with Al—P in the first year following application of Al—P.

Results of Trial #1 and Trial #2:

During the 1998 season, an initial high 2.5 and 3.5 ppm P was leached from the 1% and 2% alumina treatments respectively on Nov. 5, 1998 (FIG. 1). However—leaching from both the 1% and 2% Al—P plots had dropped from 0.5 and 0.6 ppm to approximately 0.07 ppm P by Jan. 5, 1999, and remained at that level, or lower until the trial ended in February 1999. P-leaching from the fertilizer control was very high (5 ppm on Nov. 5, 1998), though declined to 0.86 ppm by Nov. 27, 1998, and continued to fluctuate between 0.87 and a low of 0.03 ppm P throughout the remainder of the study.

The same study area was utilized again in 1999 (FIG. 2); in an attempt grow acceptable mum cuttings for a second season, without recharging the Al—P already in the soil. Leachate loss from the plots was monitored as the 'in-situ' Al—P fertilizer was used for a second season. Data from the first three weeks of the trial (1 Jul. to 16 Jul.) show very little leaching from the Al—P treatments (0.12–0.076 ppm for 1% rate, and 0.068–0.105 ppm for 2% rate). P-leaching from the fertilizer plots ranged from 0.141–0.347 ppm during that same period.

Figure 2:
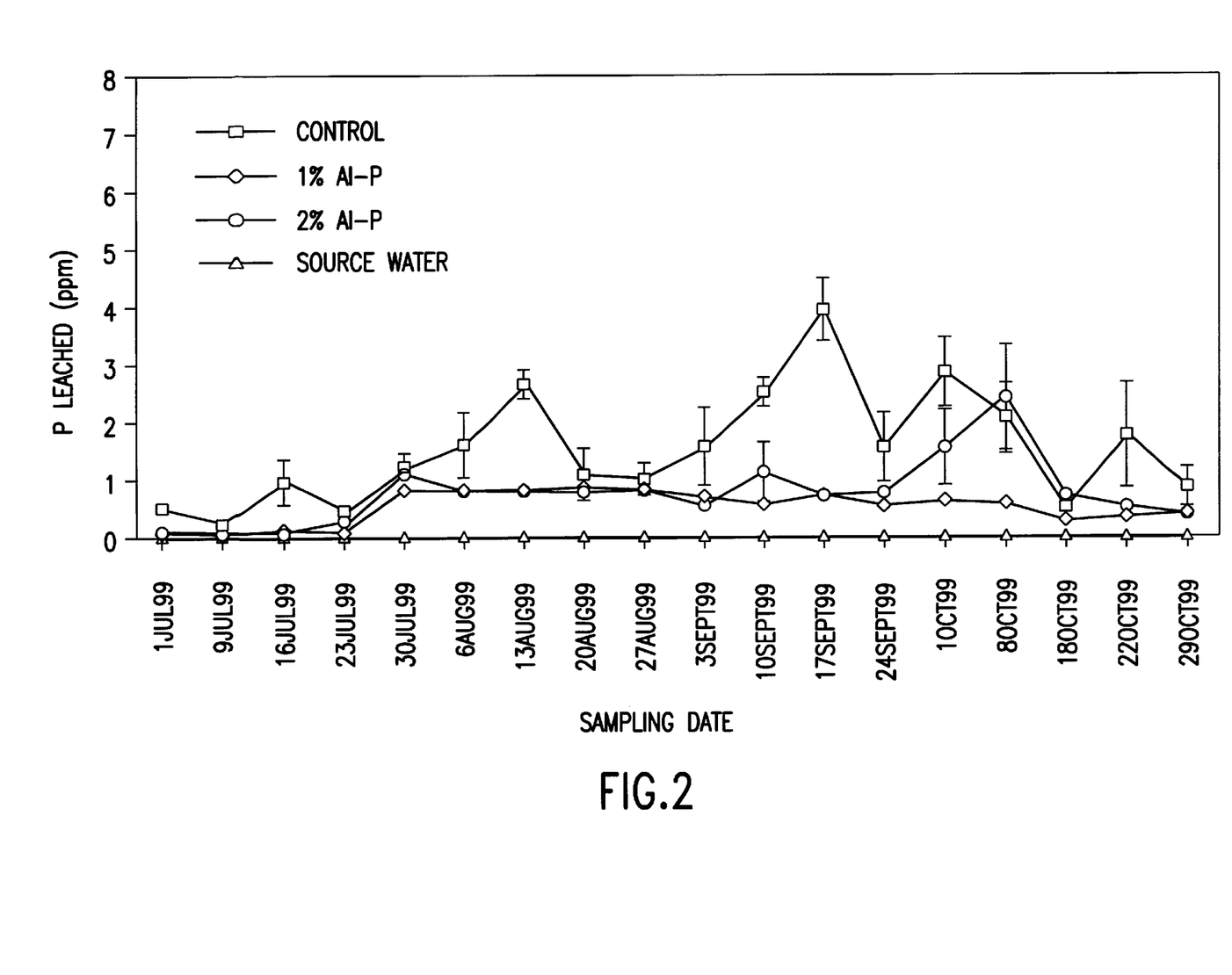
FIG. 2 is a graph showing phosphorus in leachate from beds of Florida field soil, with the x-axis showing leachate sampling dates, and the y-axis showing phosphorus leached (μM) from field soil during Chrysanthemum Trial 2 (1999) comparing conventional fertilizer versus soil amended with Al—P in the second year following application of Al—P in year one.

Loss of phosphorus from both Al—P plots increased by Jul. 30, 1999. Mean P-leaching from the 1% Al—P plots was 0.7 ppm (std err =0.02; between 0.915 and 0.536 ppm) until Oct. 8, 1999, then dropped to approximately 0.3 ppm over the remainder of the trial period. Mean phosphorus loss from the 2% plots was 0.94 ppm (std err =0.16; range 0.714 to 1.15 ppm). A large loss of phosphorus occurred from the 2% plots on 8 October. However, this may have been due to an error in fertilizer application in which conventional fertilizer was applied to the Al—P plots. In all other cases, though there was more variation in loss of P from the 2% Al—P plots, overall, the 2% Al—P data points did not appear to be significantly different from those values noted for the 1% Al—P plots (based on the graphed standard errors).

P-leaching from the fertilizer control plots fluctuated highly between Jul. 1, 1999 and the end of the trial (0.572 ppm to 3.95 ppm), with a mean weekly loss of 1.51 ppm (std err=0.24) over the study period. High losses of P from the fertilizer control plots could possibly be correlated with rainfall.

Figure 3:
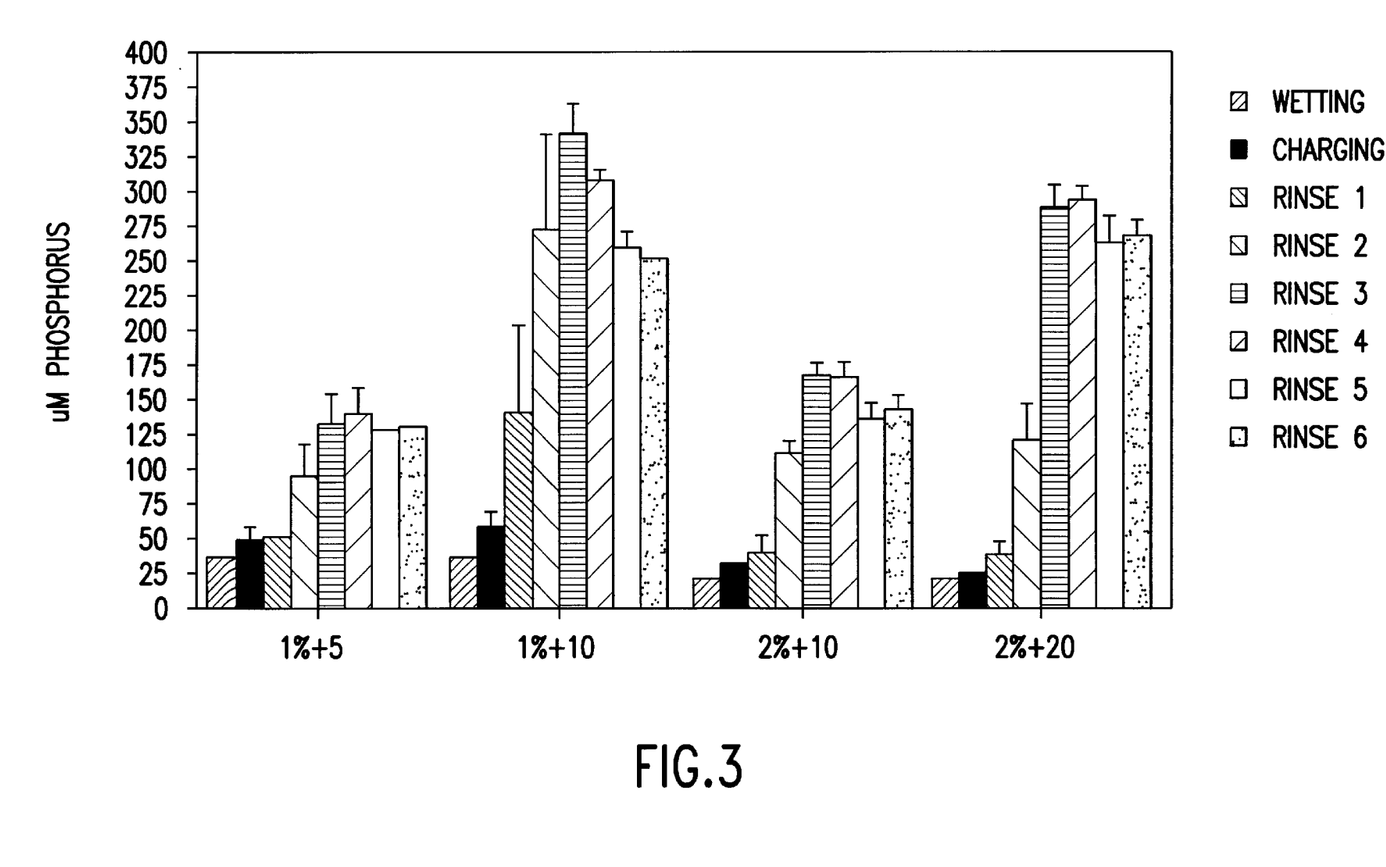
FIG. 3 is a graph showing the results of recharging of Florida field soil amended with Al—P, with the x-axis showing % Al—P in soil plus nM $H_3PO_4$ for four combinations, and the y-axis showing μM P in leachate following wetting, charging, and each of 6 rinses, respectively.
Figure 4:
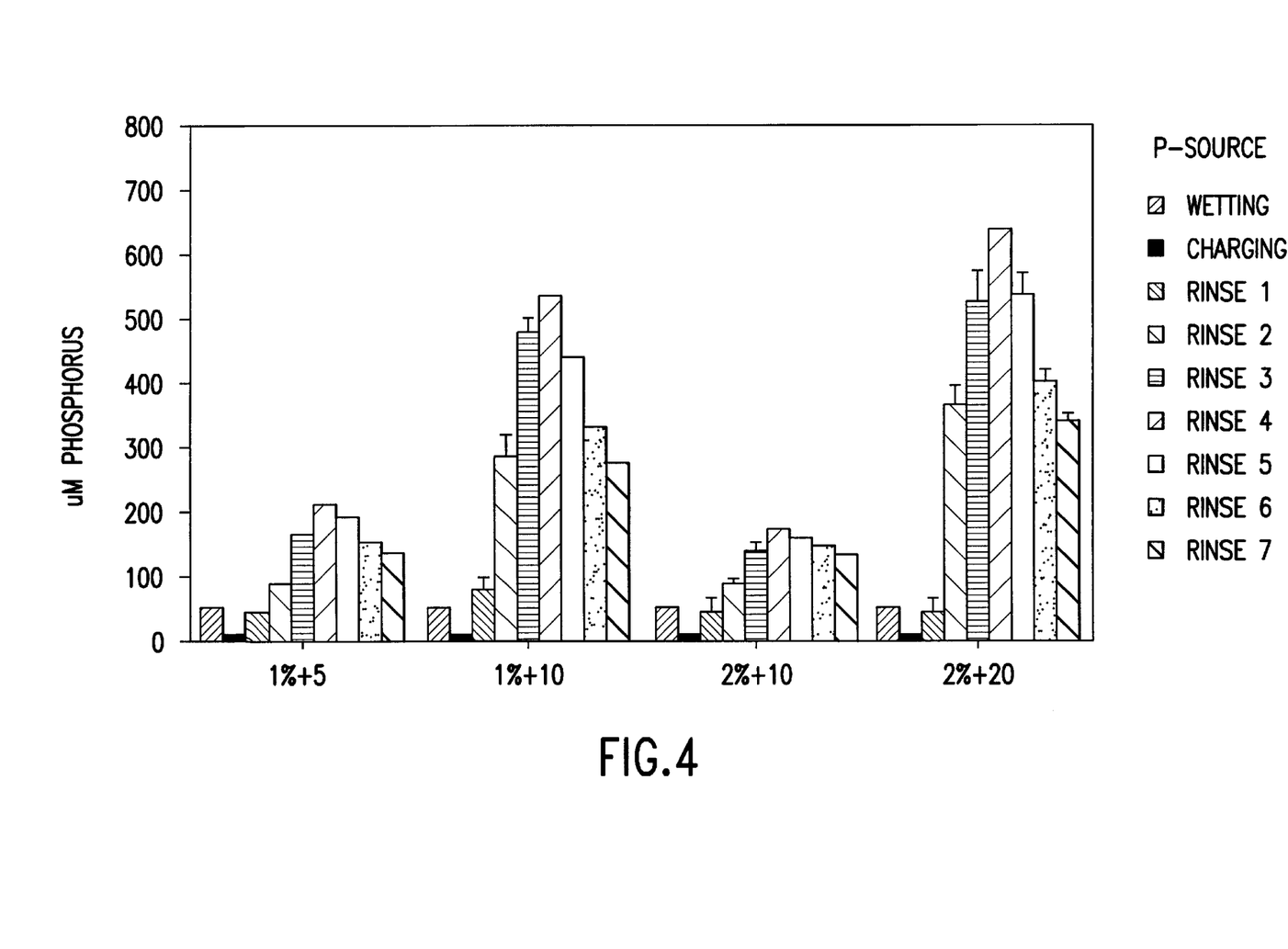
FIG. 4 is a graph showing the results of recharging of Florida field soil amended with Al—P manufactured using Compalox manufactured to buffer at 200 μM P, wit h the x-axis showing % Al—P in soil plus mM $H_3PO_4$ for four combinations, and the y-axis showing μM P in leachate following wetting, charging, and each of 6 rinses, respectively.
Figure 5:
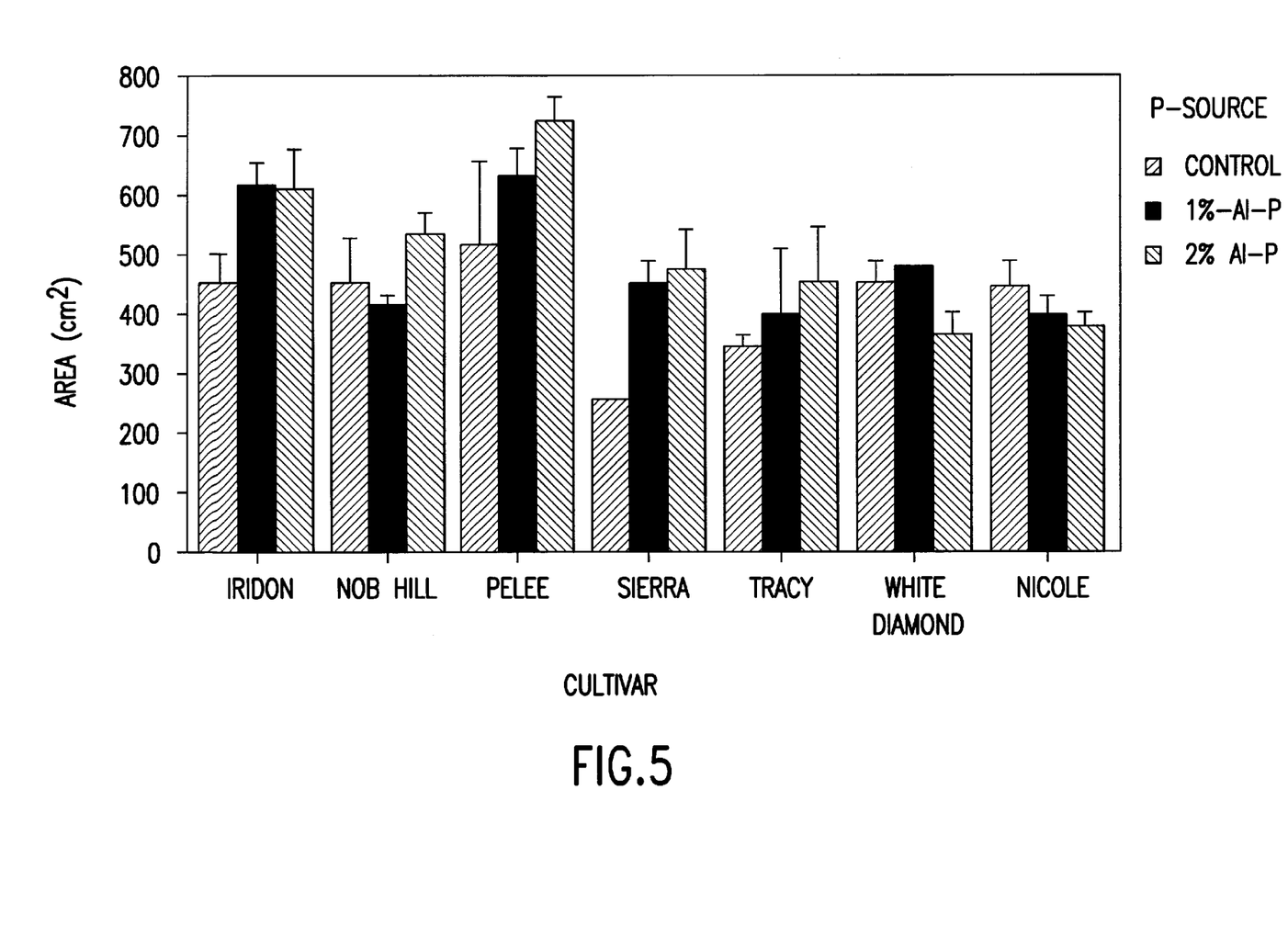
FIG. 5 is a graph showing the leaf area of 7 Chrysanthemum genotypes grown with either conventional fertilizer or Al—P, with the x-axis showing 7 cultivars of chrysanthemum and the y-axis showing leaf area ($cm^2$).
Figure 6:
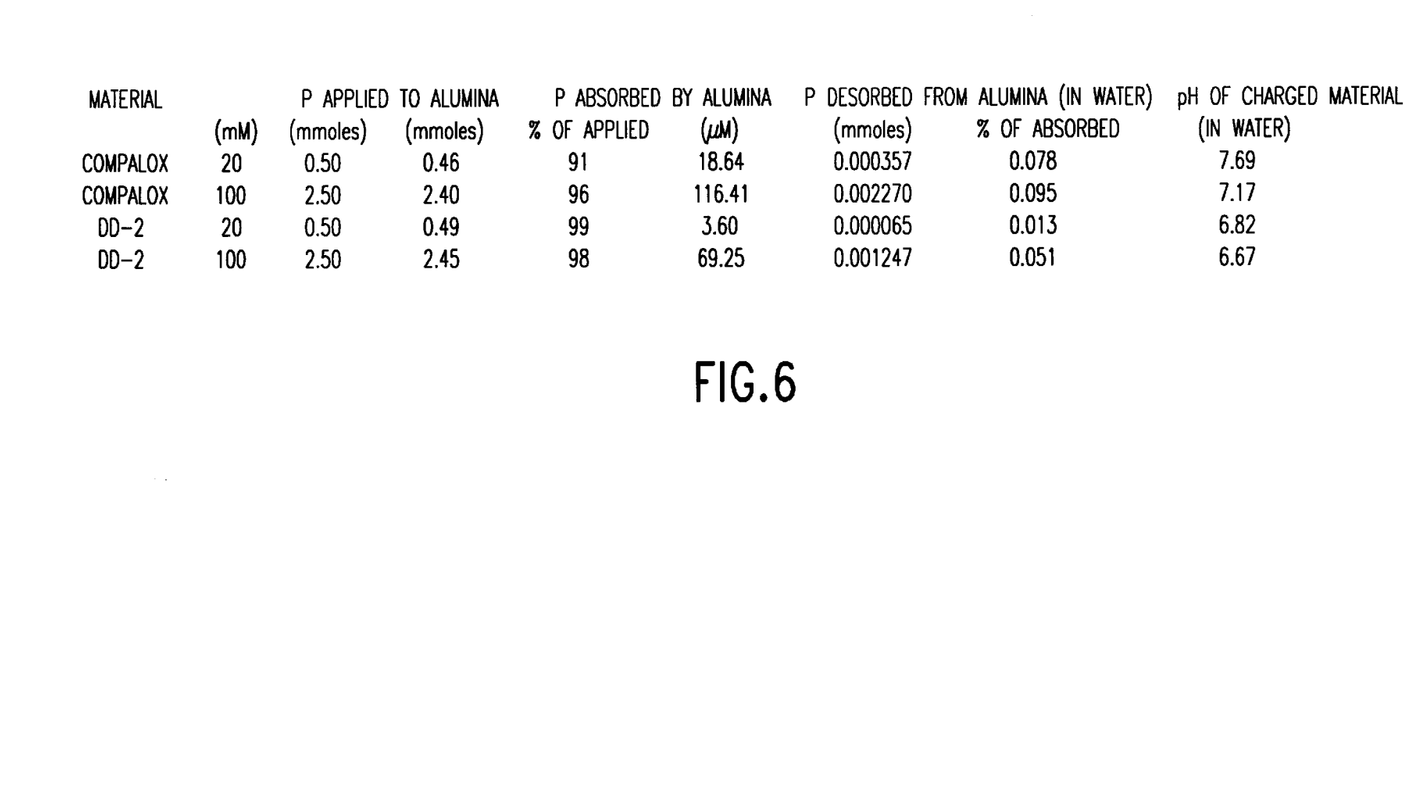
FIG. 6 is a table showing the results of test loading of two commercially available alumina products, Compalox (Alusuisse) and DD-2 (Alcoa) using, two rates of phosphoric acid.

We have described a method to recharge samples of Al—P soil, and such method was tested on soil gathered from the chrysanthemum trial. FIG. 3 shows the results of loading such soil with $H_3PO_4$ at 10 or 20 mM on soils having 1 or 2% Al—P (weight/volume basis). Results show that soil containing Al—P and used for crop production for 2 years can be successfully recharged with P by treatment with $H_3PO_4$ in the range of concentrations that can be applied through agricultural fertigation systems. FIG. 4 shows that when alumina loaded with a small amount of P is added to soil its P supply capacity can be increased by addition of $H_3PO_4$ in the range of concentrations that can be applied through agricultural fertigation systems. FIG. 5 show results leaf area of mum cuttings from season 2, the second harvest.

EXAMPLE 8

2000 Chrysanthemum Trials

A third trial has commenced using the same Al—P amended sandy Florida field soil plots from the 1998 and 1999 chrysanthemum trials (Trial 1 and Trail 2, respectively.) The third trial involves recharging the Al—P in-situ. Depleted Al—P fertilizer has been successfully recharged in the laboratory. The trial will evaluate the growth of mum cuttings and monitor the amount of phosphorus present in the leachate lost from the plots during the recharging phase and during plot maintenance over the course of the experiment. Plant growth parameters such as leaf area and dry weight of cuttings will be measured, as well as P-concentration in the leaf tissue. In addition, root samples will be taken at the end of the experiment for biomass and tissue-P concentration, as well as root topology data. The trial involves plants in three replications per treatment. A fourth replication from each treatment will remain unplanted to permit monitoring of leachate from Al—P amended Florida field soil in fallow plots.

The following method was used in the 2000 Chrysanthemum Trial (Trial 3) to recharge the soil plots used in the Trial 1 and Trial 2:

Field Method for Recharging(, Al—P in situ for Sandy Florida Field Soils

1) Allow for at least 3 consecutive days without rain. during the recharging process.

2) Wet the soil to field capacity with overhead sprinklers (at 50 gal/min for 50–60 minutes).

3) Apply phosphoric acid in sufficient volume to be equivalent to 100 gallons fertilizer/1000 sq. ft. of soil for each experimental plot. Each replicated plot was 36"l× 36"w×8"d. For our experiment, 3.5–4.0 gal/of food grade phosphoric acid (60% P) were applied to each 35-square foot replication. Plots with 1% Al—P received 155 ppm phosphorus, plots with 2% Al—P received 310 ppm phosphorus.

4) Laterally and vertically distribute the phosphoric acid drench throughout the plots, with 3–5 minutes (50 gal/mm rate of application) of overhead irritation.

5) Allow fertilizer solution to remain in contact with the Al—P amended soil for 48 hours, prior to planting.

6) Plant mum cuttings into recharged Al—P-amended on the 3rd day after recharging.

7) Water as required for growth of mum cutting.

8) Collect leachate to monitor phosphorus loss from each plot on a weekly basis.

Preliminary Results of 2000 Chrysanthemum Trial

Figure 7:
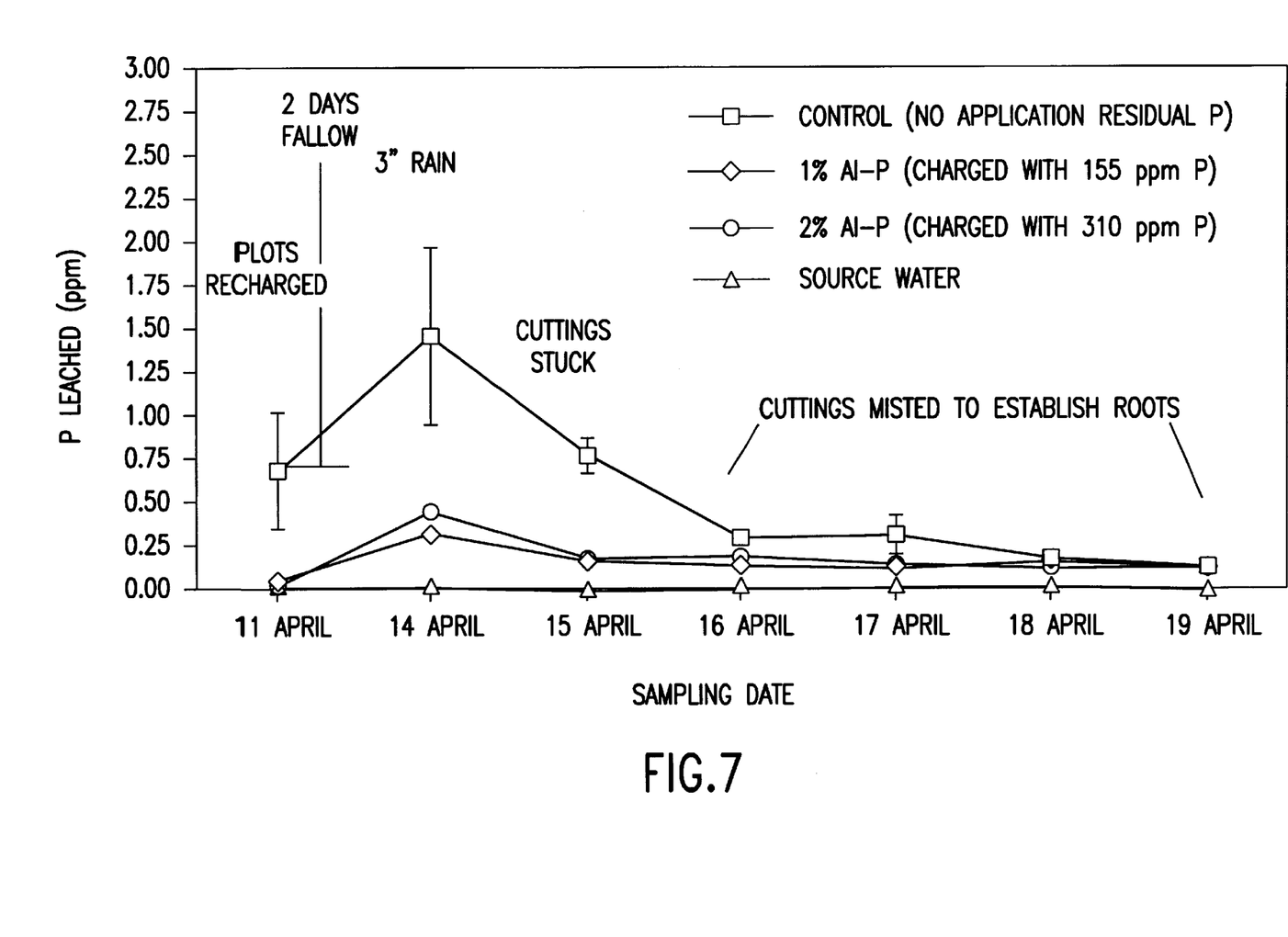
FIG. 7 is a graph showing phosphorus in leachate from beds of Florida field soil following recharging, in situ with phosphoric acid in Trial 3 (2000), with the x-axis showing leachate sampling dates, and the y-axis showing phosphorus leached (μM) from soil previously amended with Al—P in Trial 1 and Trial 2, compared to a control of soil which was not recharged.

Data presented in FIG. 7 below represents pooled measurements of phosphorus concentration in leachate from each treatment during the first week of the trial. Corresponding events are listed for each sampling date. Data for the control treatment represents residual phosphorus losses, as the control plots had not received any fertilizer treatment during the recharging session. Phosphorus loss was very low from both the 1% and 2% Alumina-P plots (approximately 0.055 ppm) after charging, while loss from the fertilizer plots, thought not treated with fertilizer was 2.5 ppm. Leached phosphorus increased slightly from both the 1% Al—P (0.328 ppm) and 2% Al—P (0.456 ppm) plots after a 3-inch rainfall over April $13^{th}$ and $14^{th}$, 2000. Leached phosphorus had decreased in the 1% Al—P plots by Apr. 15, 2000 when the cuttings were planted. The level of phosphorus lost in the leachate then fluctuated between 0.104 and 0.161 ppm during four days of misting using overhead irrigation. Phosphorus loss from the 2% Al—P plots followed the same trend observed in the 1% Al—P plots from 4/15 on, with leached levels of phosphorus fluctuating between 0.137 and 0.190 ppm.

The present invention is not limited to the embodiment described and exemplified above, but is capable of variation and modification within the scope of the appended claims.

We claim:

1. A soil composition for growing plants comprising:
    a) more than 50% by weight/volume of soil; and
    b) 0.25–20% by weight/volume of modified alumina, wherein the modified alumina comprises 0.1–150,000 ppm phosphorus bound to the alumina surface by a process comprising contacting acid-activated alumina with phosphate.

2. The composition of claim 1, comprising 0.5–16% weight/volume modified alumina.

3. The composition of claim 2, comprising 1–2% weight/volume modified alumina.

4. The composition of claim 1, wherein the modified alumina comprises 0.1–1000 ppm phosphorus.

5. The composition of claim 4, wherein the modified alumina comprises 0.3–6.2 ppm phosphorus.

6. The composition of claim 1, comprising more than 70% weight/volume soil.

7. The composition of claim 6, comprising more than 90% weight/volume soil.

8. A method of fertilizing field-grown plants with phosphorus, which comprises applying to soil in which the plants are grown a modified alumina, wherein the modified alumina comprises 0.10–150.000 ppm phosphorus bound to the alumina surface by a process comprising contacting acid-activated alumina with phosphate, wherein the phosphorus bound to the alumina is desorbed from the alumina and released into the soil in a sustained fashion, thereby supplying a consistent supply of phosphorus to the plants.

9. The method of claim 8, wherein the modified alumina is incorporated into the soil at a rate of 0.25–20% by weight/volume.

10. The method of claim 9, wherein the modified alumina is incorporated into the soil at a rate of 0.5–16% by weight/volume.

11. The method of claim 10, wherein the modified alumina is incorporated into the soil al: a rate of 1–2% by weight/volume.

12. The method of claim 8, wherein the phosphorus is desorbed from the alumina at a rate of 0.2–500 micromolar.

13. The method of claim 12, wherein the phosphorus is desorbed from the alumina at a rate of 1–250 micromolar.

14. The method of claim 13, wherein the phosphorus is desorbed from the alumina at a rate of 50–200 micromolar.

15. The method of claim 8, wherein the modified alumina is applied to unplanted soil.

16. The method of claim 8, wherein the modified alumina is applied to soil in which plants are growing.

17. The method of claim 8, which further comprises recharging the modified alumina in situ with phosphorus to restore a desired phosphorus concentration to the alumina.

18. The method of claim 17, wherein the recharging comprises wetting the soil containing the modified alumina, applying a phosphorus-containing liquid to the soil and allowing the phosphorus-containing liquid to remain in contact with the soil for a time sufficient to restore the desired phosphorus concentration to the modified alumina.

19. The method of claim 18, wherein the phosphorus-containing liquid contains phosphoric acid.

20. The method of claim 19, wherein the concentration of phosphoric acid in the phosphorus-containing liquid is in a range compatible with application through a standard agricultural fertigation system, and wherein the liquid remains in contact with the soil for at least 18 hours.

21. A method of buffering a soil against phosphate leaching, which comprises applying to the soil a modified alumina, wherein the modified alumina comprises 0.10–150,000 ppm phosphorus bound to the alumina surface by a process comprising contacting acid-activated alumina with phosphate, wherein the phosphorus bound to the alumina is desorbed from the alumina and released into the soil at a controlled rate that reduces or prevents phosphate leaching from the soil.

22. The method of claim 21, wherein the modified alumina is incorporated into the soil at a rate of 0.25–20% by weight/volume.

23. The method of claim 22, wherein the modified alumina is incorporated into the soil at a rate of 0.5–16% by weight/volume.

24. The method of claim 23, wherein the modified alumina is incorporated into the soil at a rate of 1–2% by weight/volume.

25. The method of claim 21, wherein the phosphorus is desorbed from the alumina at a rate of 0.2–500 micromolar.

26. The method of claim 25, wherein the phosphorus is desorbed from the alumina at a rate of 1–250 micromolar.

27. The method of claim 26, wherein the phosphorus is desorbed from the alumina at a rate of 50–200 micromolar.

28. The method of claim 21, wherein the modified alumina is applied to unplanted soil.

29. The method of claim 22, wherein the modified alumina is applied to soil in which plants are growing.

30. A method of making modified alumina for use in a controlled release phosphate fertilizer that reduces or prevents phosphate leaching from soil to which the fertilizer is applied, wherein the modified alumina comprises 0.1–150,000 ppm phosphorus, the method comprising contacting alumina with a solution containing phosphoric acid for a time sufficient to bind the desired amount of phosphorus onto the alumina, thereby producing the modified alumina.

31. The method of claim 30, which comprises wetting the alumina prior to contacting it with the phosphoric acid solution.

32. The method of claim 30, in which the phosphoric acid solution contains 15–500 mM phosphoric acid.

33. The method of claim 30, in which the pH of phosphoric acid-treated alumina is 6.0–7.5.

34. The method of claim 30, which further comprises drying the modified alumina.

35. The method of claim 30, wherein the modified alumina is combined with one or more plant nutrients.

* * * * *